(12) United States Patent
Bachmann

(10) Patent No.: US 11,427,313 B2
(45) Date of Patent: Aug. 30, 2022

(54) UNIVERSALLY ATTACHABLE HINGED WING AND VLOS AID FOR MUTIROTOR DRONES

(71) Applicant: Helmuth G. Bachmann, Salinas, CA (US)

(72) Inventor: Helmuth G. Bachmann, Salinas, CA (US)

(*) Notice: Subject to any disclaimer, the term of this patent is extended or adjusted under 35 U.S.C. 154(b) by 556 days.

(21) Appl. No.: 16/653,386

(22) Filed: Oct. 15, 2019

(65) Prior Publication Data

US 2021/0107637 A1 Apr. 15, 2021

(51) Int. Cl.
*B64C 27/22* (2006.01)
*B64C 39/02* (2006.01)

(52) U.S. Cl.
CPC ............ *B64C 27/22* (2013.01); *B64C 39/024* (2013.01); *B64C 2201/027* (2013.01); *B64C 2201/102* (2013.01); *B64C 2201/165* (2013.01)

(58) Field of Classification Search
CPC ......... B64C 27/22; B64C 27/28; B64C 27/30; B64C 39/04; B64C 2201/027; B64C 2201/088; B64C 2201/102; B64C 2201/165
USPC ............................................................ 244/6
See application file for complete search history.

(56) References Cited

U.S. PATENT DOCUMENTS

| | | |
|---|---|---|
| 3,166,271 A | 1/1965 | Zuck |
| 3,563,496 A | 2/1971 | Zuck |
| 3,666,209 A | 5/1972 | Taylor |
| 4,596,368 A | 6/1986 | Schmittle |
| 5,086,993 A | 2/1992 | Wainfan |
| 5,863,013 A * | 1/1999 | Schmittle ............... B64C 39/024 244/38 |
| 8,721,383 B2 | 5/2014 | Woodworth et al. |
| 9,623,969 B2 | 4/2017 | Nelson |
| 9,676,477 B1 * | 6/2017 | Kimchi ................... B64D 31/06 |
| 9,676,479 B2 | 6/2017 | Brody et al. |
| 9,783,291 B2 | 10/2017 | Kummer et al. |
| 9,994,313 B2 | 6/2018 | Claridge et al. |
| 10,850,835 B2 * | 12/2020 | Hutson ................. B64C 39/024 |
| 2011/0042508 A1 | 2/2011 | Bevirt |
| 2012/0091257 A1 | 4/2012 | Wolff et al. |
| 2015/0136897 A1 | 5/2015 | Seibel et al. |
| 2015/0329204 A1 | 11/2015 | Nelson |
| 2016/0129998 A1 | 5/2016 | Welsh et al. |
| 2016/0144957 A1 | 5/2016 | Claridge et al. |
| 2017/0233069 A1 | 8/2017 | Apkarian |
| 2017/0297738 A1 | 10/2017 | von Flotow et al. |
| 2017/0327218 A1 | 11/2017 | Morin et al. |
| 2017/0361927 A1 | 12/2017 | Lavagen et al. |
| 2018/0141655 A1 | 5/2018 | Wall |
| 2020/0324894 A1 * | 10/2020 | Fredericks ................ B64C 7/00 |
| 2021/0171191 A1 * | 6/2021 | Castellano Aldave ..................... B64C 39/024 |

FOREIGN PATENT DOCUMENTS

WO WO-2009069109 A2 * 6/2009 ............ B64C 11/001
WO WO-2018163156 A1 * 9/2018 ......... B64C 29/0025

* cited by examiner

*Primary Examiner* — Joshua E Rodden

(57) ABSTRACT

This invention relates to a universally attachable hinged wing that pivots and provides lift for multirotor drones while moving in a forward direction of flight, thus reducing power consumption and increasing payload capacity or flight duration time and distance, and provides a visual line of sight (VLOS) aid while hovering.

16 Claims, 4 Drawing Sheets

UNIVERSALLY ATTACHABLE HINGED WING AND VLOS AID FOR MUTIROTOR DRONES

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

This invention relates to a universally attachable hinged wing that pivots and provides lift for multirotor drones while moving in a forward direction of flight, thus reducing power consumption and increasing payload capacity or flight duration time and distance, and a visual line of sight (VLOS) aid while hovering. Most state of the art designs for drones or manned aircraft with wings do not utilize existing multirotor drone designs with added wings, and have rotors that are parallel to the wing's cord with separate propulsion rotors, or rotate with or relative to the wing for forward flight as in U.S. Pat. Nos. 3,563,496, 3,166,271 and applications 20150136897, 20170233069, 20160129998, and 20110042508 (abandoned) which includes rotors that are questionably fixed at an angle relative to the wing. Other designs tilt the drone nearly horizontal in flight for forward propulsion and the rotors are substantially fixed perpendicular to the wing's cord, as in US patent applications 20170361927, 20160144957. EP patent 0621843 for a conventional aircraft does include a wing that rotates freely, although forward of the aerodynamic center (AC) and the preferred embodiment uses rotational dampening as well as providing 100% of the lift for the aircraft throughout it's rotation, not just at the pivotal stop as in the first embodiment for this invention. One patent that does utilize an existing multirotor design and an attachable wing is U.S. Pat. No. 9,623,969, although the wing doesn't automatically hinge or pivot to prevent blocking airflow which can stall the rear rotors when coming to an abrupt stop or traveling backwards, or reduce drag and instability while hovering, especially in windy conditions. Also, the wing and attachment method is not for use with existing multirotor drones or drones that already have legs. Another patent that uses a multirotor design is US patent application 20170327218 in which the wing(s) are not attachable for use with existing multirotor drones and the wing pivots as a function of at least one flight parameter of the aircraft of which flight data is not readily accessible during flight on most existing drones. Additionally, pivoting is electronically controlled and doesn't utilize a mechanical pivotal stop that utilizes the physical tilt angle of the drone to determine the functional angle of attack of the wing, or an aerodynamically stabilized wing that rotates freely on it's aerodynamic center (AC). Also, each wing is laid out on the frame of the aircraft and not above the aircraft and rotors, such that a plane of the profile cord line of the wing is substantially parallel to the plane defined by the two coplanar propulsion devices, unlike the description of this invention that has the wing positioned above the rotors in order to minimize equilibrium issues and is centrally mounted with less drag from a single strut and allows wingtip designs to minimize vortex drag. WIPO (PCT) Patent 2016035068 also uses a multirotor design but the wing is not attachable to existing multirotor drones, and on portable drones that have short legs the wing would interfere with the ground when rotated vertically upon landing (referring to FIG. 3). Furthermore, the drone is designed to have extra long arms with small rotors so the downward rotor airflow wash won't interfere with the wing's performance that's attached to arms and main body. This design would be inefficient on existing drones since the rotors extend completely over the arms, unlike in the embodiment of the present invention in which the wing is positioned substantially above the rotors airflow wash when providing lift.

BRIEF SUMMARY OF THE INVENTION

It is the object of this invention to disclose the drawbacks of existing prior art for combined rotor and fixed winged drones and provide a fixed wing option for existing multirotor drones.

It is a further object to the present invention to provide a hinged wing that is quick and easy to attach to existing multirotor drones.

It is a further object to the present invention to provide a hinged wing that increase the flight time and range of existing multirotor drones and better performance than similar prior art.

It is a further object to the present invention to provide a hinged wing that increases the visual line of sight (VLOS) and visible orientation of a drone while hovering.

It is a further object to the present invention to provide a hinged wing that can be manufactured as an detachable integral part of a drone.

DETAILED DESCRIPTION OF THE INVENTION

Figure 1:
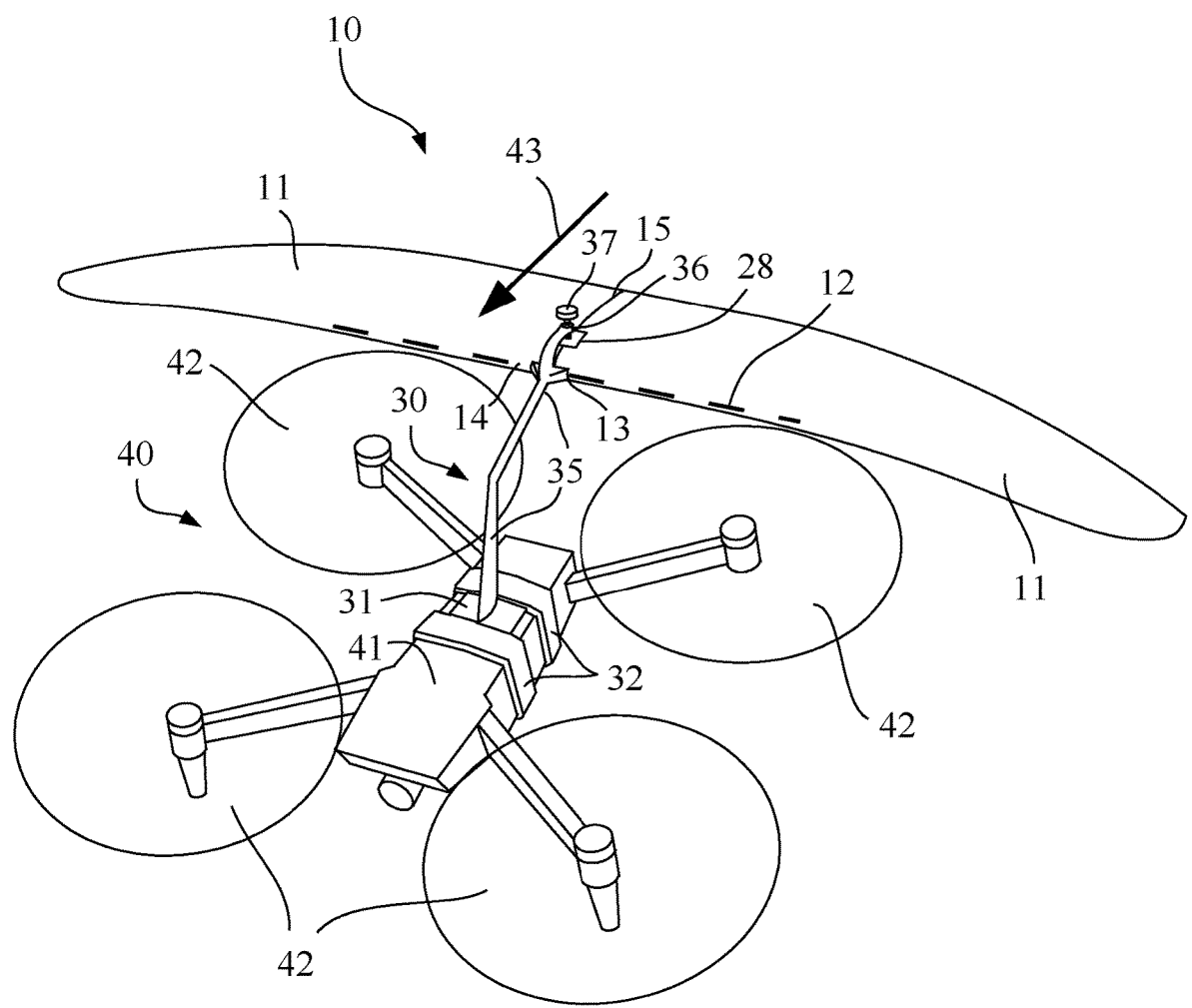
FIG. 1 is a front perspective view of a hinged wing embodying the invention and a drone in a forward direction of flight.
Figure 2:
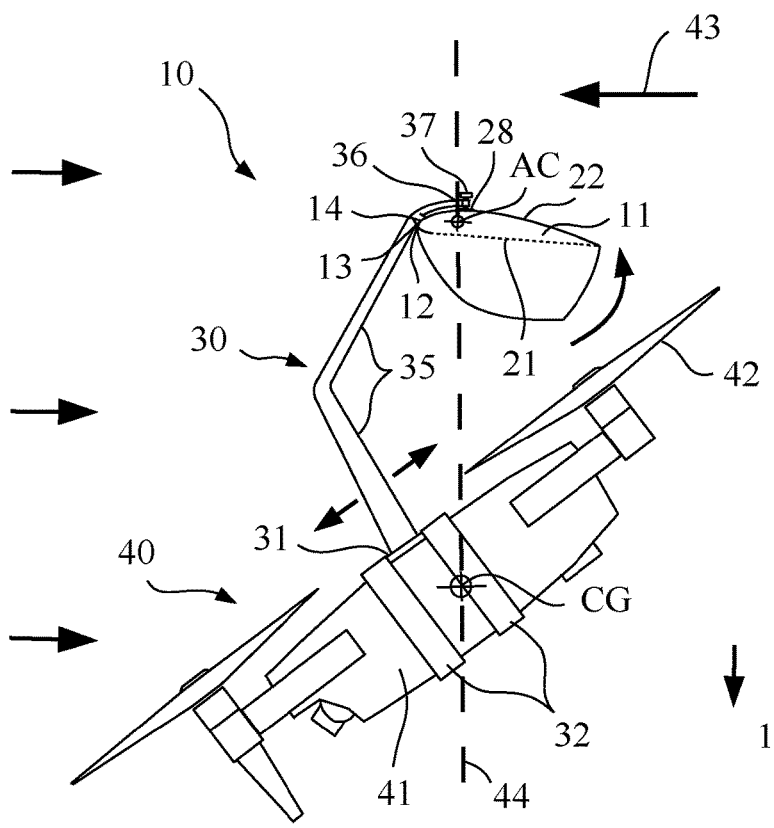
FIG. 2 is a side view of the first embodiment of a hinged wing and a drone in the forward direction of flight.
Figure 3:
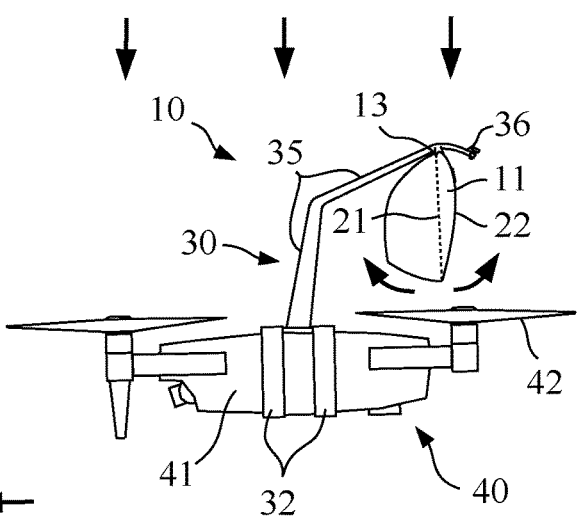
FIG. 3 is a side view of the first embodiment of a hinged wing and a drone while hovering.
Figure 8:
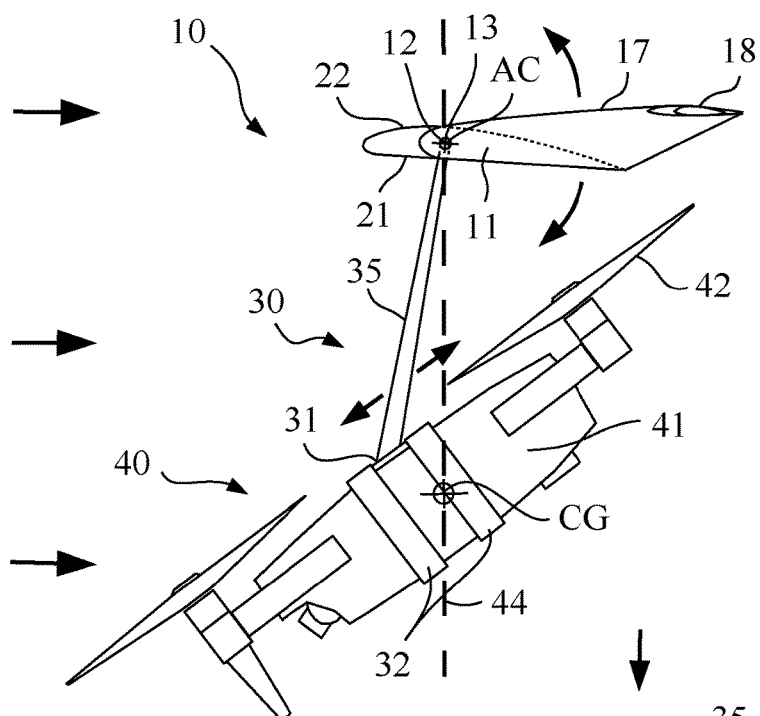
FIG. 8 is a side view of the second embodiment of a hinged wing and a drone in the forward direction of flight.
Figure 9:
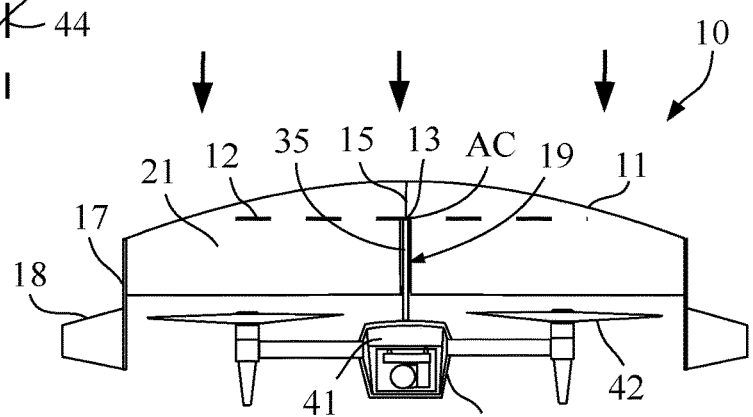
FIG. 9 is a front view of the second embodiment of a hinged wing with an extended wingtip endplate and tail wing at each end of a wing and a drone when hovering or stationary.
Figure 10:
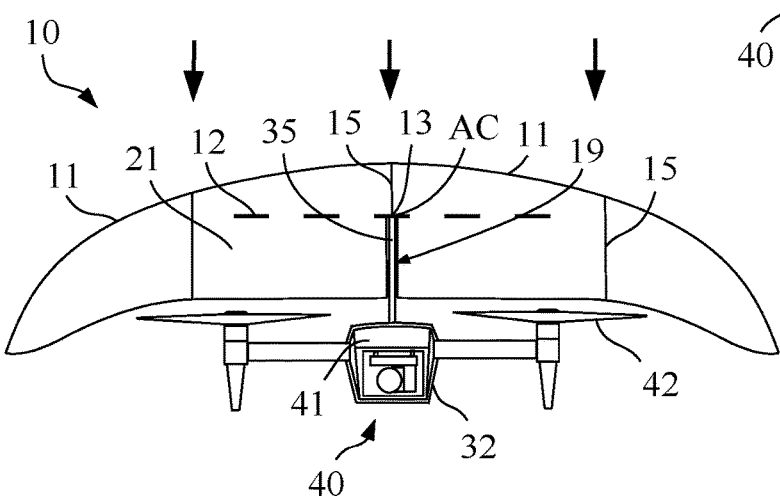
FIG. 10 is a front view of the second embodiment of a hinged wing and a drone when hovering or stationary.

Referring now to the drawings, and more particularly to FIGS. 1 through 3, a hinged wing 10 for a multirotor drone 40 with a body 41 and coplanar rotors 42, comprised of a wing 11 with a pivotal span axis 12 and the wing 11 is pivotally mounted with a hinge 13 about the pivotal span axis 12 substantially perpendicular to the forward flight vector 43 of the drone 40 and the pivotal span axis 12 is substantially above the plane of the coplanar rotors 42 to rotate freely with airflow (three large parallel arrows). In the first embodiment of the present invention, a pivotal stop 36 is used at a predetermined angle relative to the drone 40 to control the angle of attack for lift, as shown in FIGS. 1 and 2. In the second embodiment of the present invention as shown in FIGS. 8 through 10, the wing 11 pivots or hinges at the aerodynamic center (AC) and the pivotal span axis 12 of the wing 11 without a pivotal stop 36 and the angle of attack of the wing is aerodynamically controlled for lift. As shown, for the preferred embodiment(s) of this invention the wing 11 is pivotally mounted with the hinge 13 at one end of a strut 35 so the wing 11 is substantially above the rotors 42 airflow wash when providing lift. At the other end of the strut 35 the wing mount 30 has a mount base 31 which is easily attached and detached from the body 41 of different multirotor drone 40 designs, with the use of one or more hook and loop material straps 32.

Figure 6:
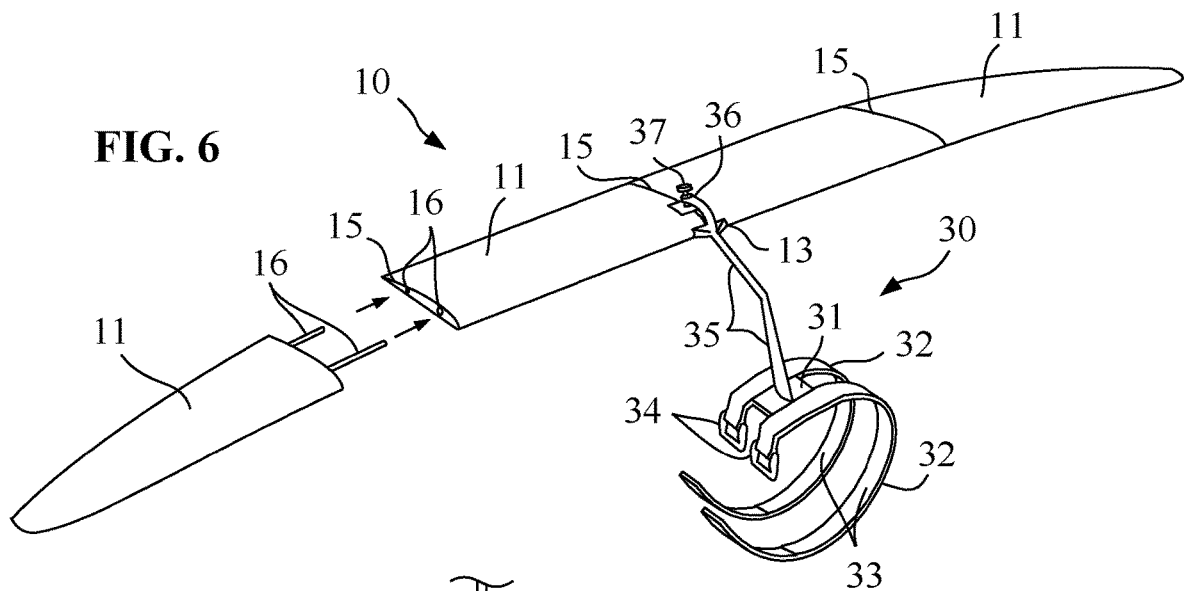
FIG. 6 is a front perspective view of a large hinged wing made of wing sections and wing mount attachment straps.

The first embodiment of the hinged wing 10 is more portable with less complexity and parasitic drag, which is more suitable for smaller portable consumer drones and toy drones. As shown in FIG. 2, the wing 11 is mounted and pivots on it's leading edge 14 and when the drone 40 is in a forward flight direction with a forward flight vector 43 the wing 11 pivots backward and upward along with the change in airflow (three large parallel arrows) and is stopped by the pivotal stop 36, which furthermore has an adjustment screw 37 with a wing reinforcement pad 28 on the wing 11 to adjust the preferred functional angle of attack for lift. For operation at higher speeds the angle of attack is set at a higher angle to correspond with the increased forward tilt (pitch) angle of the drone, generally close to 30 degrees at maximum tilt. Higher speeds are less efficient since the drone 40 has more tilt angle and generates more form drag relative to the lift from the wing 11, and to some degree the reduced weight of the drone from the lift and drag of the wing 11 also reduces the forward drive/force and the tilt angle must be increased for a given speed. If set at lower angle of attack the wing 11 provides lift and reduces power consumption at lower speeds which is more efficient and the wing 11 pivots freely at higher speeds, which is advantageous by providing a higher top end speed, although without reduced power consumption. On some drones such as the DJI Mavic® series, the operator can determine the lowest power consumption by looking at the power reading (radar display) and GPS speed to determine the best speed for the drone during flight, and make adjustment to the pivotal stop 36 accordingly. On the DJI Mavic® Pro a wing 11 that has a 21 inch span reduces power consumption by over 30% at 27 mph. A relatively larger wingspan provides greater reduction, but causes instability in strong winds and should only be used in light wind conditions. CsvView software was used for the analysis of the .DAT data files generated by a DJI Mavic® Pro which displayed the power consumption for each motor and the average in watts per second (Watt-Secs), with a steady (no aerodynamic oscillations) and equal load on all motors relative to GPS ground speed with and without the wing 11 in calm wind conditions. The lower motor/rotor RPM also reduces the noise level of the drone 40. DJI's sport mode was used to provide enough forward thrust and speed for the wing 11 to operate efficiently. Different wing 11 sizes are used depending on the weight of the drone and the desired speed of operation for different applications. Drones that have less latency response from the Inertial Measurement Unit (IMU), Electronic Speed Controllers (ESCs) and motors have more stability when handling a relatively larger wing 11. Also, as shown in FIG. 1 in order to help reduce the instability of a relatively larger wingspans during tight turns the wing 11 ends are curved downward to increasing inside wing 11 lift and deceasing the outside wing 11 lift, which would normally be compensated by ailerons when coming out of a turn and also reduce wingtip vortices. Standard vortex reducing wingtips can be used on a straight wing 11 for better lift to drag ratios (not shown). Also, any induced rotational wash generated by the counter clockwise rotation of the rear rotors 42 that reach a smaller wing 11 helps to counteract the apposing wingtip vortices. Generally, in order to increase the functional angle of attack of the wing 11 and speed range the wing section will have more forward camber or thickness and a high aspect ratio. For portability as shown in FIG. 6, a relatively larger wing 11 is comprised of several sections that can be assembled and dissembled to lengths similar to the size of a portable drone 40 at each seam 15 which has internal reinforcement tubes 16 known to the state of the art.

Figure 4:
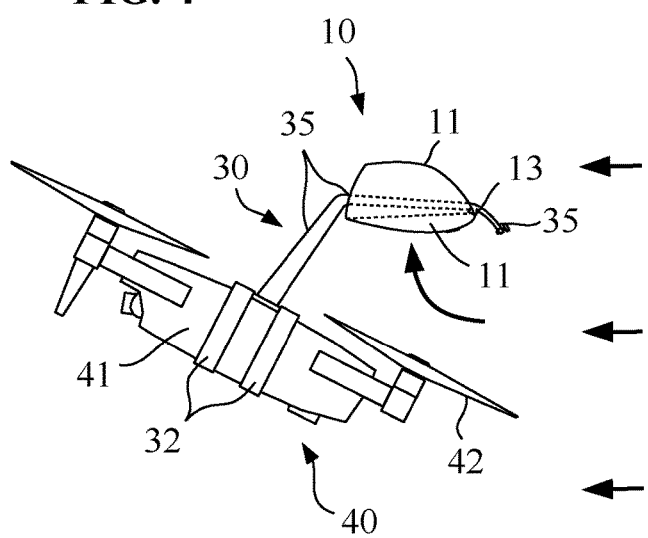
FIG. 4 is a side view of the first embodiment of a hinged wing and a drone in a backward direction of flight.
Figure 5:
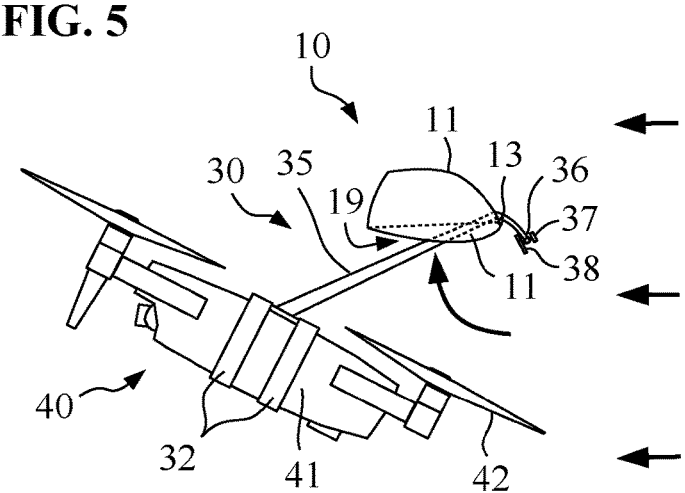
FIG. 5 is a side view of the first embodiment of a hinged wing with a completely straight strut and a drone in a backward direction of flight.

When the drone 40 stops traveling and is hovering the wing 11 rotates downward with the change in airflow (large parallel arrows) as shown in FIG. 3. This prevents blocking airflow and stalling the rear rotors 42 when coming to an abrupt stop or in a backward direction of flight as in FIG. 4, reducing drag and instability while hovering, especially in windy conditions. A bend in the strut 35 clears the wing 11 when the drone 40 is traveling in a backward direction of flight and allows for the full rotation of the wing 11 under all conditions and won't interfere with landing or drone 40 sensors. A different embodiment of the wing mount 30 as shown in FIG. 5 has a strut 35 that is completely straight and the wing 11 is split with a gap 19 in the middle with enough space to allow the wing 11 to rotate forward past the strut 35, and again to reduce the rotational drag of the drone 40 each side can be constructed to pivot independently. A straddling flange 38 is used on the end of the adjustment screw 37 to stop each side of the wing 11 in the first embodiment.

As mentioned earlier in FIGS. 8 through 10, the second embodiment of the hinged wing 10 pivots or hinges at the aerodynamic center (AC) of the wing 11 without a pivotal stop 36 and the angle of attack of the wing 11 is aerodynamically controlled. This provides a continuous angle of attack and lift at different tilt angles of the drone 40, and an inflight power meter for measuring instantaneous power consumption during flight isn't necessary for the best adjustment of the angle of attack, as in the first embodiment. For a stable aerodynamically balanced wing 11 at the aerodynamic center (AC), different wing 11 combinations can be utilized such as a canard wing or a reflexed camber aerofoil. For this embodiment an extended wingtip endplate 17 with tail wing 18 is utilized at each wing tip of the wing 11, as shown in FIGS. 8 and 9. For different applications and greater portability a wing 11 that is raked at the ends is used as shown in FIG. 10. Furthermore each wing 11 is split with a gap 19 in the middle behind the hinge 13 with enough space to allow the wing 11 to rotate forward past the strut 35, and to reduce the rotational drag of the drone 40 when hovering, each side can be constructed to pivot independently.

Figure 7:
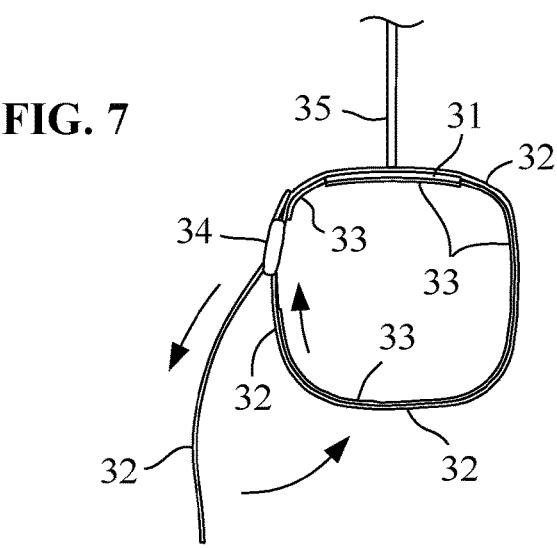
FIG. 7 is an expanded front partial view of a wing mount with attachment straps.

For flight equilibrium and equal load distribution of the motors and rotors 42, the wing mount 30 is positioned so the center of gravity (CG) of the drone 40 is substantially close to the aerodynamic center (AC) of the wing 11 along a vertical line 44 when tilted during the operational speed of the wing 11, and to avoid bottom sensors as shown in FIGS. 2 and 8. For the proper placement of the wing mount 30 the aerodynamic center (AC) is marked on the bottom of the wing 11 on the first embodiment and the wing mount 30 is positioned to balance the drone 40 when held at the desired angle of flight for the operational speed of the wing 11 for both embodiments. Also, some additional adjustment can be made to equally distribute the power load between the front and rear rotors 42/motors for greater efficiency, and less overall power consumption. Now referring to FIGS. 5 through 7, the attachment of the hinge wing 10 to a drone 40, the hook and loop material straps 32 on the wing mount 30 are quickly looped around the body 41 of the drone 40, then through the eyelets 34 and tightened to fit the girth (not shown) and secured in place by the hook and loop material on the hook and loop material straps 32 as shown in FIG. 7. For detachment or repositioning the hook and loop material straps 32 are quickly released, which may be necessary in order to change the battery between flights on some drones 40. When attached, the wing mount 30 is designed to provide torsional support for the wing 11 and rubber grip pads 33 on the wing mount 30 and hook and loop material straps 32 prevent slippage and protect the drone's body 41.

Now referring to FIGS. 2, 3 and 8 through 10, the wing 11 also has a large front and back profile while hovering which provides greater visibility of the drone 40 to maintain or recover the visual line of sight (VLOS) at maximum distances, required by law in some countries. The front and back of the wing 11 can be different colors such as red for the bottom surface 21 (frontside of drone 40) and green for the top surface 22 (backside of drone 40) which would indicate the orientation of the drone 40 while hovering. Signage can also be placed on the surface of the wing 11 for advertisement or as a security warning. Also, during a flight failure the drone 40 will glide at a high rate of speed with the hinged wing 10, reducing the vertical speed of impact and providing flotation in a water recovery for wet restoration or an insurance claim. The wing 11 can also be used to carry additional payload or battery capacity for extended flight range without abnormally stressing the drone 40. Without a payload the reduction of power consumption reduces stress and the heat and energy loss from the motors and battery The present invention has been fully described by way of example with the accompanying drawings. Various alternations and changes can be made without departing from the spirit and broader aspects of the invention as set forth in the appending claims, which are to be interpreted in accordance with the principles of patent law including the doctrine of equivalents.

I claim:

1. An attachable hinged wing provided for a multirotor drone with center of gravity (CG) coplanar rotors, a body and a forward flight vector, comprising: a wing with an aerodynamic center (AC), a top and bottom surface and two sides with two ends, a leading edge and a pivotal span axis, and said wing is pivotally mounted with a hinge about said pivotal span axis substantially perpendicular to said forward flight vector of said drone and said pivotal span axis is substantially above said coplanar rotors plane, wherein said wing freely hinges and rotates down with airflow when said drone is hovering and rotates upward with airflow from the forward direction of said forward flight vector of said drone to create lift substantially above said rotors and said rotors airflow wash.

2. The attachable hinged wing in claim 1 further comprises a pivotal stop and said wing is mounted with said hinge on said leading edge of said wing, wherein said wing is stopped at a predetermining angle with said pivotal stop to provide an angle for lift from said wing.

3. The attachable hinged wing recited in claim 2 further comprises an adjustment screw on said pivotal stop, wherein said screw is rotated to provide angle adjustment of said wing at said pivotal stop.

4. The attachable hinged wing in claim 1 further comprises an aerodynamically balanced wing and said pivotal span axis and said hinge of said wing is located substantially at the aerodynamic center (AC) of said wing, wherein the angle of attack of said wing is aerodynamically controlled by said wing to provide lift.

5. The attachable hinged wing in claim 4 further comprises an extended wingtip endplate with a tail wing on each said end of said wing and said pivotal span axis of said wing is located substantially at the aerodynamic center (AC) of said wing.

6. The attachable hinged wing in claim 1 further comprises a wing mount and said wing is mounted on said wing mount with said hinge; wherein said wing mount attaches and detaches from said drone and said wing mount is positioned so the center of gravity (CG) of said drone is substantially centered vertically below said aerodynamic center (AC) when said drone is tilted during the operational speed of said wing during flight.

7. The attachable hinged wing in claim 6 characterized in that said wing mount comprises a strut with two ends with a mount base at one end and said hinge and said wing mounted at the other end, wherein said mount base attaches and detaches to said drone and said strut is made with a narrow shape to reduce aerodynamic drag.

8. The attachable hinged wing in claim 7 wherein said strut is made with a bend, wherein said strut allows said wing to pivot freely without hitting said strut.

9. The attachable hinged wing in claim 7 wherein said strut is straight and said wing is made with two separate said sides with a gap between each said side, wherein each said side pivots past said wing mount freely through said gap without hitting said strut.

10. The attachable hinged wing in claim 9 wherein each said side is mounted to pivot independently, wherein reducing the rotational drag of each said side of said wing when rotationally hovering said drone.

11. The attachable hinged wing in claim 1 wherein each said end of said wing is curved downward, wherein said wing ends reduce drone flight instability on turns and wing drag vortexes.

12. The attachable hinged wing in claim 7 further comprises one or more hook and loop material straps with eyelets on said mount base, wherein said straps are passed through said eyelets then tightened and secured in place by hook and loop material on said hook and loop material straps around said body to secure said mount base, and said wing mount can be easily positioned or repositioned so the center of gravity (CG) of said drone is substantially centered vertically below the aerodynamic center (AC) when said drone is tilted during the operational speed of said wing during flight.

13. The attachable hinged wing in claim 12 further comprises foam rubber grip pads on said mount base and said hook and loop material straps, wherein said rubber grip pads firmly grip said body of said drone.

14. The attachable hinged wing in claim 1 wherein said top and bottom surface of said wing are each colored with a different color, wherein said wing profile and color provides greater visibility of said drone to maintain or recover the visual line of sight (VLOS) and the orientation of said drone while hovering.

15. The attachable hinged wing in claim 6 wherein said wing mount is made of carbon fiber.

16. The attachable hinged wing in claim 1 wherein said wing is made of a rigid foam.

* * * * *